W. S. MIEHLE.
ADJUSTABLE WRENCH.
APPLICATION FILED DEC. 1, 1909.
975,707.
Patented Nov. 15, 1910.
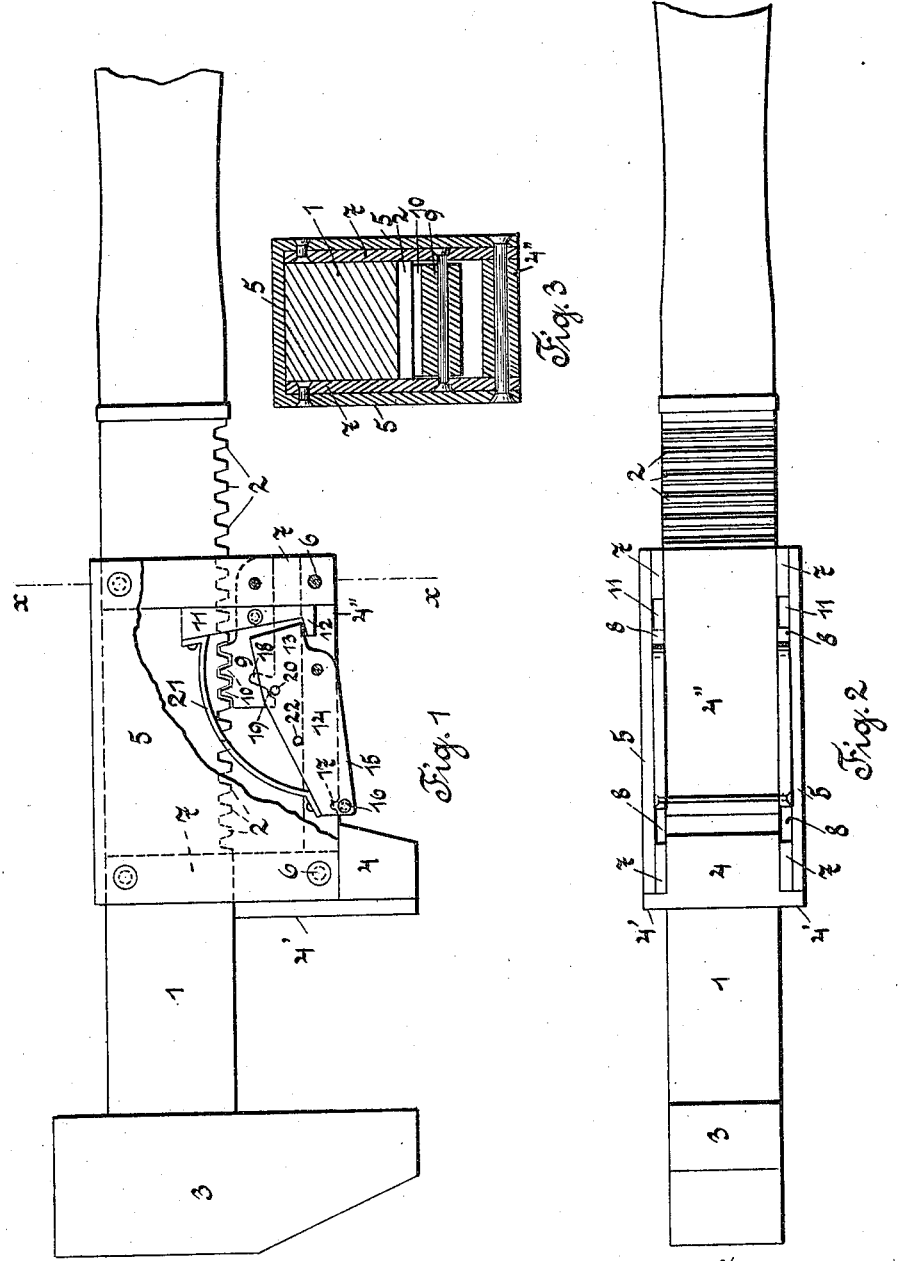
Witnesses:
Carl R. Aberle
B. G. Richards
Inventor:
William S. Miehle
by Joshua R. H. Potts
his Attorney.

UNITED STATES PATENT OFFICE.

WILLIAM S. MIEHLE, OF CHICAGO, ILLINOIS.

ADJUSTABLE WRENCH.

975,707.

Specification of Letters Patent.  Patented Nov. 15, 1910.

Application filed December 1, 1909. Serial No. 530,841.

*To all whom it may concern:*

Be it known that I, WILLIAM S. MIEHLE, a citizen of the United States, residing at Chicago, county of Cook, and State of Illinois, have invented certain new and useful Improvements in Adjustable Wrenches, of which the following is a specification.

My invention relates to improvements in adjustable wrenches and has for its object the provision of suitable means on the movable jaw of the wrench whereby said jaw may be quickly adjusted to different sized nuts and securely held in engagement therewith.

The invention consists in the combination and arrangement of parts hereinafter described and claimed.

The invention will be best understood by reference to the accompanying drawings forming a part of this specification, and in which, Figure 1 is a partial elevation of a wrench embodying my invention, with parts broken away, Fig. 2, a bottom plan view of Fig. 1, and Fig. 3, a section on line $x$—$x$ of Fig. 1.

The preferred form of construction as illustrated in the drawings comprises a suitable shank 1 provided with teeth 2 on its front face as shown. The shank 1 is provided with a fixed jaw 3 at its outer end and with a movable jaw 4 slidable thereon. The jaw 4 is slidably mounted on shank 1 by means of a U-shaped casing 5 embracing said shank and in which said jaw is secured. Jaw 4 is secured in casing 5 by means of rivets 6, spacing bars 7 interposed between the sides of said jaw and said casing on each side and at either end forming a central space 8 between said jaw and said casing on either side. At its engaging end jaw 4 is provided with flanges 4' covering and protecting the exposed ends of casing 5. Within casing 5 is pivoted a dog 9 having teeth 10 adapted to engage teeth 2 on the face of shank 1 to lock the casing and movable jaw in position thereon. Catches 11 are pivoted to dog 9 at either side thereof and extend at substantially right angles to said dog resting in the space 8 above mentioned. At their outer ends catches 11 are provided with projections 12 engaging the lower corners 13 of levers 14 also pivoted in space 8 in said casing. The forward edges 15 of levers 14 project from the front of casing 5 as shown and a pin 16 is secured between said projecting edges to serve as a means for manipulating said levers simultaneously. A notch 17 is provided in the shank portion 4'' of the jaw 4 to receive said pin 16 and permit the inward movement of the edges 15 of levers 14 to withdraw dog 9 from engagement with the teeth of shank 1. Dog 9 is provided with a comparatively deep notch 18 having a comparatively shallow notch 19 near its end as shown and adapted to receive a pin 20 connecting levers 14. Springs 21 are secured to catches 11 and levers 14 as shown and serve to yieldingly hold the dog 9 in engagement with teeth 2. A stop pin 22 connecting levers 14 is positioned to engage the inner wall of shank portion 4'' to limit the outward movement of levers 14. By this arrangement it will be seen that upon depression of levers 14 by means of pin 16 the pin 20 will travel into the deep portion of notch 18 and dog 9 will be withdrawn to permit quick slidable adjustments of jaw 4 on shank 1. When pin 16 is released dog 9 is thrown into engagement with the teeth on shank 2 by the action of springs 21 and pin 20 passes into the shallow notch 19 thus serving as a positive lock against disengagement of dog 9 by back pressure thereon. Thus it will be seen that the movable jaw 4 may be readily adjusted to different sized nuts and will be positively locked against disengagement.

While I have illustrated and described the preferred form of construction for carrying my invention into effect this is capable of variation or modification without departing from the spirit of my invention. I therefore do not wish to be limited to the exact details of construction set forth but desire to avail myself of such variations and modifications as come within the scope of the appended claims.

Having described my invention what I claim as new and desire to secure by Letters Patent is:

1. An adjustable wrench comprising a toothed shank; a fixed jaw on said shank; a U-shaped casing embracing said shank; a movable jaw secured at the upper end of said casing; distance bars interposed between each end of said casing and said shank at each end of said casing; a toothed dog pivoted between the lower of said distance bars and arranged to engage the teeth on said shank; catches pivoted at their central portions to each side of said dog and having upturned projections at their outer ends; levers pivoted in each side of said casing with their lower ends engaging said upturned projections and their upper ends projecting from the front of said casing; and springs interposed between the upper ends of said levers and the inner ends of said catches, substantially as described.

2. An adjustable wrench comprising a toothed shank; a fixed jaw on said shank; a U-shaped casing embracing said shank; a movable jaw secured at the upper end of said casing; distance bars interposed between each end of said casing and said shank at each end of said casing; a toothed dog pivoted between the lower of said distance bars and arranged to engage the teeth on said shank; catches pivoted at their central portions to each side of said dog and having upturned projections at their outer ends; levers pivoted in each side of said casing with their lower ends engaging said upturned projections and their upper ends projecting from the front of said casing; a self-locking notch and pin connection between said dog and said lever; a pin connecting the projecting upper ends of said levers; and springs interposed between the upper ends of said levers and the inner ends of said catches, substantially as described.

In testimony whereof I have signed my name to this specification in the presence of two subscribing witnesses.

WILLIAM S. MIEHLE.

Witnesses:
HELEN F. LILLIS,
JOSHUA R. H. POTTS.